United States Patent [19]

Mölders

[11] 3,963,227
[45] June 15, 1976

[54] GAS SPRING WITH DUAL DAMPING ARRANGEMENT

[75] Inventor: Werner Mölders, Mayen, Germany

[73] Assignee: Stabilus GmbH, Koblenz-Neuendorf, Germany

[22] Filed: Mar. 18, 1975

[21] Appl. No.: 559,515

[30] Foreign Application Priority Data
Mar. 26, 1974 Germany............................ 2414457

[52] U.S. Cl.............................. 267/120; 267/64 R; 296/56; 296/57 R
[51] Int. Cl.².......................................... F16F 5/00
[58] Field of Search................ 267/64 R, 64 A, 113, 267/120; 296/56, 57; 188/269, 316

[56] References Cited
UNITED STATES PATENTS 3,446,318  5/1969  Duckett............................ 267/64 R
3,851,867  12/1974  Fricko................................ 267/120

Primary Examiner—James B. Marbert
Attorney, Agent, or Firm—Hans Berman

[57] ABSTRACT

A gas spring of the cylinder-and-piston type having a throttling passage in the piston has a cup-shaped receptacle coaxially mounted on the piston about the piston rod and a plunger mounted on the annular end wall of the cylinder through which the piston rod passes. The plunger enters the receptacle when the piston rod approaches the outer end of its stroke, and fluid can be displaced by the plunger from the receptacle only through a narrow gap between respective walls of the plunger and receptacle for supplemental damping action.

8 Claims, 3 Drawing Figures

GAS SPRING WITH DUAL DAMPING ARRANGEMENT

This invention relates to gas springs, and particularly to a gas spring having a body of gas confined in the cavity of a cylinder, a piston which divides the cavity into two compartments, and a throttling passage connecting the compartments.

In its more specific aspects, the invention is concerned with an improvement in a gas spring suitable for balancing the weight of a hood or trunk lid in a motor car without restricting access to the engine compartment or the trunk of the car. The damping effect of the narrow throttling passage connecting the two compartments in conventional gas springs is sufficient to keep the hood or lid open in cooperation with the friction in the hinges connecting the hood or lid to the fixed parts of the car body, but it offers little opposition to manually applied force. Whenever the hood or lid approaches its fully open position, it moves fast enough to stop with a sudden shock. The useful life of the hinges and associated elements is significantly reduced by the repeated shocks inherent in normal use of the car.

A primary object of this invention is the provision of an improved gas spring of the described type equipped with a dual damping arrangement of which one is effective in a basically known manner, while the other one additionally impedes relative movement of the piston and cylinder as the piston approaches one end of its stroke.

With this object and others in view, as will presently become apparent, the invention provides a gas spring comprising a cylinder and a piston axially movable in the cylinder cavity and axially dividing the same into compartments respectively adjacent the two, axially spaced, radial end walls of the cylinder, the two compartments being connected by a throttling passage. A piston rod attached to the piston passes outward of the cylinder cavity through one of the end walls in sealing engagement with the same. The superatmospheric pressure of a body of gas in the cavity biases the piston rod outward. A receptacle member is arranged in the one compartment of the cylinder cavity which is adjacent the afore-mentioned one end wall and defines a space open in one axial direction. The same compartment also contains a plunger member. The two members are secured to the piston and to the one end wall respectively in a position in which the space in the receptacle is open toward the plunger member. The latter is dimensioned to enter the space of the receptacle during axial movement of the piston toward the one end wall.

Other features and many of the attendant advantages of this invention will readily become apparent from the following detailed description of preferred embodiments when considered in connection with the appended drawing in which.

Figure 1:
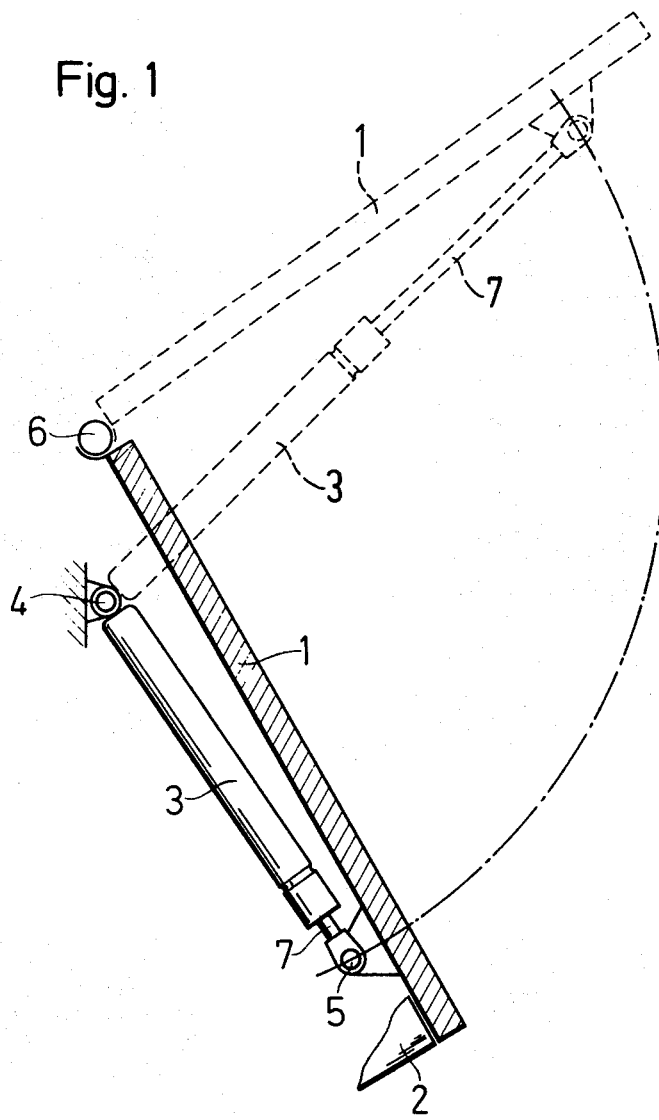
FIG. 1 shows a motor car equipped with a gas spring of the invention in fragmentary, side-elevational section.

Referring now to the drawing in detail, and initially to FIG. 1, there is shown only as much of a motor car as is necessary for an understanding of this invention, the non-illustrated portion of the car being conventional.

The flat lid 1 closes the trunk in the car body 2 when in the fully drawn position and may be swung on the supporting car body on hinges 6 into the open position indicated in broken lines. It is held open by a gas spring whose cylinder 3 is attached to the fixed body parts by a pivot pin 4. Another pivot pin 5 connects the accessible end of a piston rod 7 to a portion of the lid 1 remote from the hinges 6 and travels in an arc indicated by a chain-dotted line from a position lower than that of the pivot pin 4 in which the lid 1 closes the open side of the trunk cavity to one above the pivot pin 4 when the lid is opened.

Figure 2:
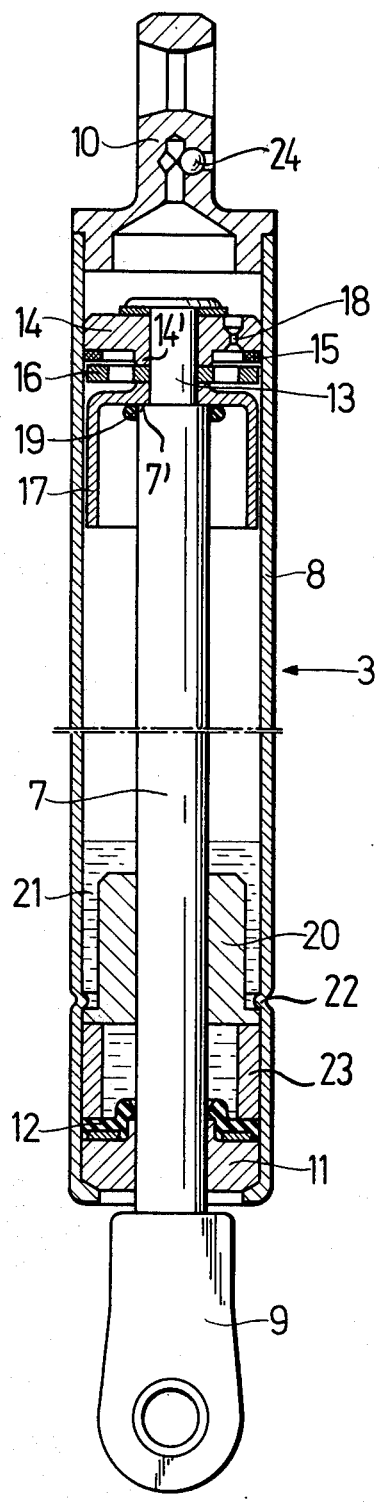
FIG. 2 illustrates the gas spring of FIG. 1 in enlarged section on its axis.
Figure 3:
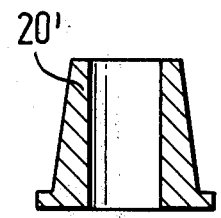
FIG. 3 shows a modified portion of another gas spring of the invention in axial section.

The structure seen in FIG. 1 is conventional, and the invention resides in improvements concealed within the cylinder 3 and shown in FIGS. 2 and 3.

The pivot pin 5, not itself seen in FIG. 2, engages a fastening eye 9 on the piston rod 7, and a similar eye is integral with the radial end wall 10 of the cylinder 3 and normally receives the pivot pin 4. The axial wall 8 of the cylinder 3 connects the end wall 10 with an annular end wall 11 covered by a washer 12 of resilient material for movable, sealing engagement with the piston rod 7. The piston rod has an inner axial end portion 13 of reduced diameter on which a piston 14 is mounted for joint axial movement with the piston rod 7. The cavity bounded by the walls 8, 10, 11 of the cylinder 3 is divided by the piston 14 into two compartments which permanently communicate with each other through a throttling passage 18 in the piston 14. The cylinder cavity is partly occupied by a small body 21 of oil or hydraulic fluid and otherwise by a much larger body of compressed air or nitrogen, not specifically shown. The gas may be replenished through a check valve 24 in the end wall 10.

The elements of the gas spring described so far are known and function in a known manner. When the lid 1 is closed, the gas spring assumes a position closely similar to that seen in FIG. 2, and the liquid 21 collects near the end wall 11. When the lid is being opened, the end wall 11 rises above the end wall 10, the liquid 21 flows toward the piston 14 which itself moves away from the illustrated position, and the opening movement of the lid 1 is impeded by the liquid flowing through the passage 18 with a force which increases with the rate of lid movement. However, the liquid is forced through the passage 18 in an initial stage of the lid opening, and only air flowing through the passage 18 exerts a braking action much smaller than that exerted by liquid. The lid thus stops suddenly in the fully open position from a relatively high speed. It is not practical to mount the cylinder on the trunk lid for overcoming this difficulty.

The problem could be avoided by arranging the gas spring in such a manner that the pivot pin 5 is above the pivot pin 4 in all positions of the lid 1, but this would require mounting the spring in a position in which it would interfere with access to the open trunk.

The invention provides a supplemental damping arrangement including a receptacle 17 which, in the embodiment shown in FIG. 2, has the general shape of a cylindrical cup. An opening in the flat bottom of the receptacle 17 is passed by the conforming, reduced end 13 of the piston rod 7 so that the receptable 17 is secured to the piston rod 7 and the piston 14 by the shoulder 7' connecting the reduced rod portion 13 to the generally cylindrical remainder of the piston rod. An axially apertured disc 16 is abuttingly interposed between the receptacle 17 and a tubular projection 14' of the piston 14.

A piston ring 15 spacedly envelops the projection 14' and has an axial width which permits the ring 15 to move between positions of abutting and sealing engagement with respective opposite radial faces of the disc 16 and the piston 14 while sealingly engaging the inner face of the cylinder wall 8 at all times. When the piston rod 7 moves outward of the cylinder 3, the piston ring 15 seals the narrow gap between the piston 14 and the inner face of the cylinder wall 8, thereby restricting fluid flow to the passage 18. When the piston rod 7 moves inward of the cylinder 3, the ring 15 moves away from the piston and opens the gap whose flow section supplements that of the passage 18, thereby reducing the damping effect.

The receptacle 17 has an outer diameter slightly smaller than the inner diameter of the wall 8 and is coaxially mounted in the cylinder 3 so that the outer face of the receptacle and the inner face of the wall 8 bound an annular gap which is quite narrow but has a flow section greater than that of the passage 18 with or without the supplemental passage described above.

The inner diameter of the receptacle 17 is slightly greater than the outer diameter of a cylindrical plunger 20 axially secured relative to the end wall 11 by an annular rib 22 on the cylinder wall 8 and a cylindrical spacer ring 23 axially interposed between the plunger and the end wall 11. The rib 22 engages radial projections on the plunger 20. Recesses between the projections, not explicitly shown, connect the axially adjacent cylinder compartment with the space within the ring 23 so that the space is filled with liquid in the illustrated position of the cylinder 3.

As the cylinder 3 swings from the position shown in FIG. 2 toward the position shown in broken lines in FIG. 1, liquid 21 flows from the end wall 11 toward the end wall 10. A portion of the liquid is trapped in the space within the receptacle 17, and the remainder passes between the receptable 17 and the cylinder wall 8 and exerts its damping force as it passes through the throttling passage 18. When all available liquid 21 is confined between the piston 14 and the end wall 10 and cannot provide damping action in the passage 18, liquid is being trapped in the receptacle 17 by the entering plunger 20 and can leave the receptacle only through the annular throttling aperture between respective, axial, cylindrical walls of the receptacle and plunger, thereby impeding movement of the trunk lid into its terminal position with a force which can be chosen by suitably dimensioning the plunger and receptacle. An O-ring 19 stretched to fit around the piston rod 7 and engaging the bottom wall of the receptacle 17 prevents leakage between the piston rod 7 and the receptacle 17 and acts as a resilient bumper for absorbing residual energy of lid movement.

Depending on the manner in which it is intended to install the gas spring, the positions of the plunger and receptacle on the piston 14 and the end wall 11 may be interchanged in an obvious manner. A cup-shaped receptacle which is annular about the piston rod 7 makes best use of the limited space available in the cylinder 3, but at least some of the advantages of this invention may also be achieved by receptacles differently arranged and differently shaped. With the illustrated cylindrical receptacle and plunger, the flow resistance of the annular aperture between the plunger and receptacle walls changes relatively little with movement of the plunger inward of the receptacle space. Other shapes of receptacle and plunger will readily be chosen if different characteristics of the supplemental damping arrangement are desired.

One such modified damping arrangement is shown in FIG. 3. It combines a conically tapering plunger 20' with apparatus not otherwise significantly different from that shown in FIG. 2 so that the flow section of the throttling aperture in the supplemental damping arrangement decreases as the piston nears the end of its stroke. Other modifications of the plunger and/or the cooperating receptacle will readily suggest themselves to those skilled in the art as specific conditions may require.

A throttling passage in the piston 14 modified by a movable piston ring 15 has been shown specifically and is preferred. However, it is well known to provide compartment-connecting throttling passages in the cylinder wall or even outside the cylinder cavity and to shape or otherwise arrange such passages to reduce their effective flow section during outward movement of the piston rod while increasing the flow section during axial inward movement of the piston rod.

Because of its much higher viscosity, a liquid provides greater damping force under otherwise analogous conditions than a gas. The apparatus illustrated, however, is operative without the illustrated liquid, particularly when close dimensional tolerances are observed.

It should be understood, therefore, that the foregoing disclosure relates only to preferred embodiments of the invention, and that it is intended to cover all changes and modifications of the examples of the invention herein chosen for the purpose of the disclosure which do not depart from the scope and spirit of the invention defined in the appended claims.

What is claimed is:

1. A damping arrangement comprising:
   a. a support defining an interior space having an open side;
   b. a lid member;
   c. hinge means securing said lid member to said support for movement about a horizontally extending axis between a first position in which said lid member closes said open side and a second position remote from said first position; and
   d. a gas spring including:
      1. a cylinder having an axis and defining an axially elongated cavity therein, said cylinder including two axially spaced radial end walls,
      2. a piston axially movable in said cavity and dividing the same into two compartments,
      3. means defining a throttling passage connecting said compartments,
      4. a piston rod attached to said piston and passing axially outward of said cavity in sealing engagement with one of said end walls,
      5. a body of gas and a body of liquid jointly filling said cavity, the pressure of said gas being higher than atmospheric pressure,
      6. a plunger member secured to said one end wall in said cavity,
      7. a receptacle member mounted on said piston, said receptacle member being open toward said plunger member and dimensioned to receive said plunger member during axial movement of said piston rod outward of said cavity;
   e. first pivot means pivotally fastening the other end wall to said support; and f. second pivot means pivotally fastening said piston rod to said cover member,
  1. said second pivot means being downwardly spaced from said first pivot means in said first position of said lid member,
  2. said second pivot means being upwardly spaced from said first pivot means in said second position of said lid member, and
  3. the spacing of said first and second pivot means being sufficiently greater in said second position than in said first position to cause said plunger member to be received in said receptacle member in said second position of said lid member,
  4. said plunger member and said receptacle member jointly bounding a throttling aperture open toward said one compartment when said plunger member enters said receptacle member during said axial movement of said piston rod.

2. An arrangement as set forth in claim 1, wherein said bodies are separated from each other, said body of gas being greater than said body of liquid.

3. An arrangement as set forth in claim 1, wherein said receptacle member is annular about said piston rod.

4. An arrangement as set forth in claim 1, wherein said piston rod has an axial end portion in said cavity, said receptacle member is cup-shaped and has a radial bottom wall formed with an opening therethrough, said end portion conformingly passing through said opening and being fastened to said piston.

5. An arrangement as set forth in claim 4, wherein said end portion is of reduced cross section, a shoulder of said piston rod axially connecting said end portion to the remainder of said piston rod and constituting an element of the securing means securing said receptacle member to said piston.

6. An arrangement as set forth in claim 4, further comprising a resilient buffer member on said bottom wall limiting axial movement of said plunger member.

7. An arrangement as set forth in claim 6, wherein said buffer member is annular about said piston rod.

8. An arrangement as set forth in claim 1, further comprising control means associated with said throttling passage and responsive to axial movement of said piston rod for reducing the effective flow section of said passage during movement of said piston rod outward of said cavity while increasing said flow section during axial inward movement of said piston rod.

* * * * *